United States Patent
Chiocca et al.

(10) Patent No.: US 6,725,213 B1
(45) Date of Patent: Apr. 20, 2004

(54) METHOD AND MECHANISM FOR PROVIDING EXTERNAL PROCEDURES TO A DATABASE SYSTEM

(75) Inventors: Michael Chiocca, Mountain View, CA (US); Nancy Ikeda, Los Altos Hills, CA (US); Beethoven Cheng, Belmont, CA (US)

(73) Assignee: Oracle International Corporation, Redwood Shore, CA (US)

( * ) Notice: Subject to any disclaimer, the term of this patent is extended or adjusted under 35 U.S.C. 154(b) by 0 days.

(21) Appl. No.: 09/429,265

(22) Filed: Oct. 29, 1999

(51) Int. Cl.[7] .............................................. G06F 17/30
(52) U.S. Cl. .................. 707/3; 707/1; 707/10
(58) Field of Search .............................. 707/3, 4, 5, 10, 707/101, 102, 104; 709/203, 312

(56) References Cited

U.S. PATENT DOCUMENTS

| | | | | |
|---|---|---|---|---|
| 5,987,463 A | * | 11/1999 | Draaijer et al. | 707/10 |
| 6,041,344 A | * | 3/2000 | Bodamer et al. | 709/203 |
| 6,049,800 A | * | 4/2000 | Govindrajan et al. | 707/10 |
| 6,108,660 A | * | 8/2000 | Ikeda et al. | 707/101 |
| 6,192,418 B1 | * | 2/2001 | Hale et al. | 709/312 |
| 6,236,997 B1 | * | 5/2001 | Bodamer et al. | 707/10 |

* cited by examiner

Primary Examiner—Sanjiv Shah
(74) Attorney, Agent, or Firm—Bingham McCutchen LLP

(57) ABSTRACT

The present invention is directed to a method and mechanism for calling on external procedure in a database system in which the external procedure contains embedded database query language statements. According to an aspect of the invention, the external procedure executes using the same database connection and transaction as the original calling entity for that external procedure.

33 Claims, 8 Drawing Sheets

METHOD AND MECHANISM FOR PROVIDING EXTERNAL PROCEDURES TO A DATABASE SYSTEM

BACKGROUND OF THE INVENTION

1. Field of the Invention

The invention relates to computer systems, and more particularly to a method and mechanism for calling an external procedure in a database system in which the external procedure contains embedded database query language statements.

2. Background

Modern database systems are normally configured to allow users to interface with the database system using database query language statements such as Structured Query Language ("SQL") statements. SQL is a language specifically designed to access and interface with data/data structures in a relational database system. To provide increased flexibility for querying a database, some database manufacturers provide extensions to the SQL language standard. For example, "PL/SQL" is a SQL-derived database query language developed by Oracle Corporation that provides procedural language extensions to the generally non-procedural SQL language standard.

While SQL and SQL-derived languages are well suited for database access purposes, these specialized languages lack the flexibility and power of many general purpose programming languages such as "C" and "C++". This is particularly true for programming operations that need to be performed outside the context of the database (e.g., operating system calls). To enhance the capabilities of the database, some database systems provide a mechanism that allow users to invoke general purpose programming language functions or routines that are external to the database (sometimes referred to as "external routines" or "external procedures"). One such mechanism for implementing external procedures is described in co-pending U.S. patent application Ser. No. 08/880,326, entitled "Apparatus and Method for Calling External Routines in a Database System", filed on Jun. 23, 1997, which is hereby incorporated by reference in its entirety. In this approach, an external procedure is written in a general purpose programming language, such as C, that is compiled and archived into a shared library. The compiled external procedure is thereafter dynamically loaded at runtime or whenever it is invoked at the database server.

Although a general purpose programming language provides greater flexibility and power when compared to a SQL or SQL-derived language, the SQL or SQL-derived language program is often much easier to develop and use to make calls to a database. This is due to the specialized nature of the SQL and SQL-derived language, which were specifically created to access and query data stored in database systems.

To illustrate this relative advantage of the SQL or SQL-derived language program, consider the program steps needed in a typical general purpose programming language program to perform the common database act of searching and retrieving from a database system. To correctly interoperate with a database system, the general purpose programming language routine normally includes program statements from an applications programming interface ("API") that was developed to access the database system. For example, the Oracle Call Interface (OCI) library is a set of APIs for the C and C++ language for accessing database systems available from Oracle Corporation. Similar API libraries are employed to access systems from other database vendors. The general programming language program normally requires numerous API calls and program statements to perform the common database act of querying and retrieving data, including, for example, statements and calls to define variables, access database data structures, perform data search, perform data comparison, and error handling statements. In contrast, the SQL or SQL-derived language program is able to utilize a single "SELECT" statement to perform the equivalent act of searching and retrieving data from a database.

Typically, general purpose programming languages such as C and C++ do not directly support statements written in a database query language such as SQL. However, hybrid languages have been developed incorporating elements of both general programming languages and database query languages. These hybrid languages allow programmers to specify database operations by embedding database query language statements (e.g., SQL) into the source code of general purpose program language programs. In many cases, a precompiler reads the source code files that contain embedded SQL statements and generates source code files in which the embedded SQL statements have been replaced with calls to database access routines to perform the operation specified in the embedded SQL statements that they replace. Examples of hybrid language types include Pro*C/C++ and Pro* COBOL.

With the arrival of such hybrid languages, it is now desirable to provide a mechanism that allows procedures and routines in such hybrid languages to be called even if these procedures and routines are external to the database. It is particularly desirable to allow embedded database query language statements in these external procedures to execute within the same database connection and transaction as the entity that called the external procedure, to allow the embedded database query language statements in the external procedure to call back into the database.

SUMMARY OF THE INVENTION

The present invention is directed to a method and mechanism for calling an external procedure in a database system in which the external procedure contains embedded database query language statements. According to an aspect of the invention, the external procedure executes using the same database connection and transaction as the original calling entity for that external procedure. In an embodiment, this is performed by identifying connection information for the entity that called the external procedure, mapping that connection information to equivalent connection data structures maintained for the external procedure, and thereafter executing the external procedure within the same session previously opened by the entity.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and mechanism for calling an external procedure in a database system in which the external procedure contains embedded database query language statements. According to an aspect of the invention, the external procedure executes using the same database connection and transaction as the original calling entity for that external procedure. In the following description, for the purposes of explanation, one or more embodiments having specific combinations of elements are set forth in order to provide a thorough understanding of the present invention. It will be apparent, however, to one skilled in the art that the present invention may be practiced without these specific combinations of elements.

Figure 1:
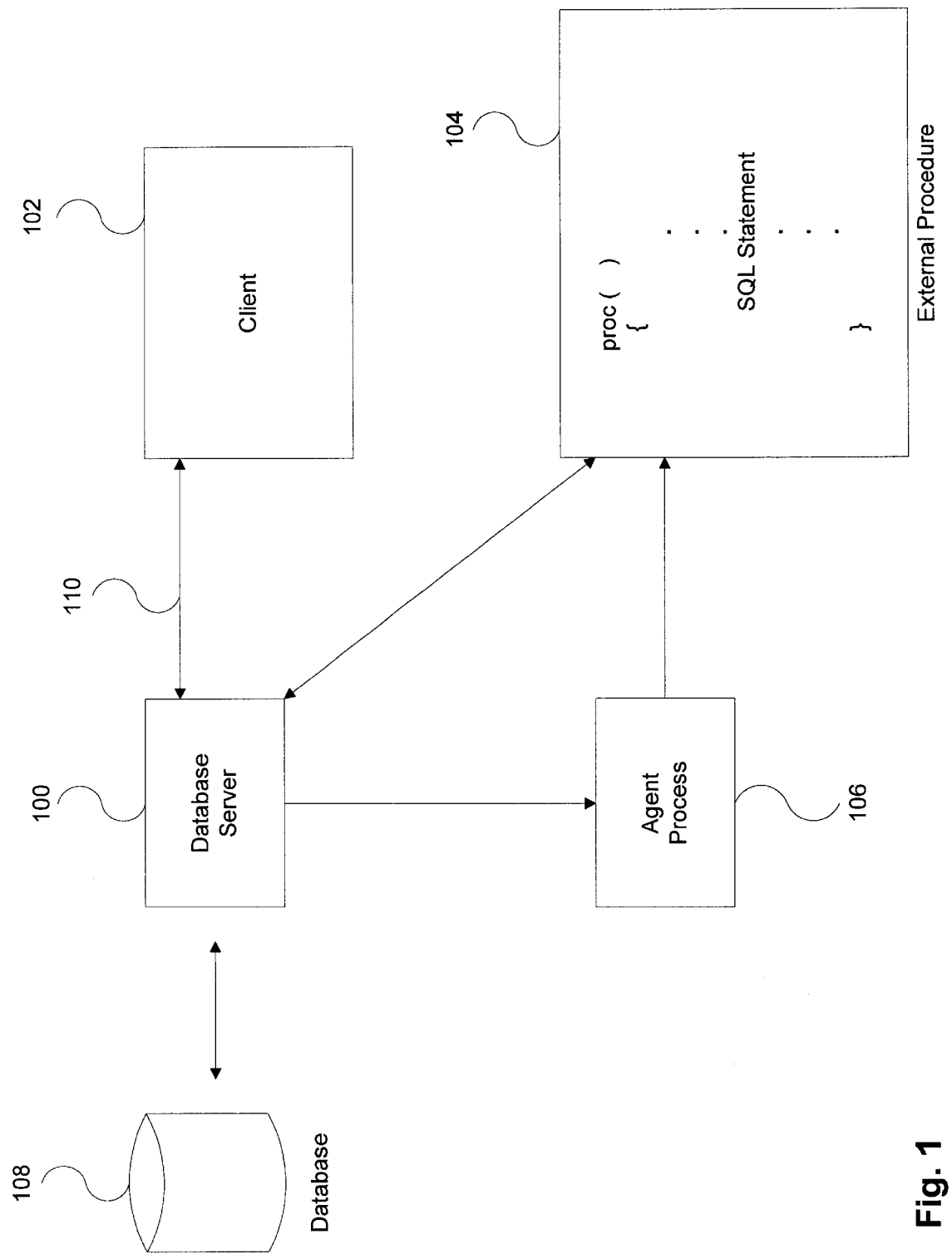
FIG. 1 depicts an embodiment of an architecture for executing external procedures having embedded database query language statements.

FIG. 1 depicts an architecture for executing an external procedure according to an embodiment of the invention directed to client-server database systems. Such client-server systems include a database 108 that is controlled and accessed by a database server 100. The raw database data is stored at database 108 while database server 100 performs the functions of searching, retrieving, storing, and modifying that raw data. The database system includes one or more clients 102. To access the database 108, a user at client 102 normally establishes a database "session", which is an individualized connection to the database server 100. The user issues commands to perform a "transaction", which is a discrete set of database operations to be executed and committed as a group. The database operations for the transaction are interpreted and executed by the database server 100. If the client 102 has multiple independent users, then each user may establish its own session with the database having a separate network connection and transaction identifier. Similarly, the database system may have multiple clients 102 each having multiple and separate sets of connections by users on each client. Note that the architecture elements of FIG. 1 may reside on the same or different hardware components without affecting the scope of the invention, so long as the elements are communicatively connected.

In normal operation, a user at client 102 issues commands for a database operation that is sent to database server 100 over connection 110. The database operation request is received and performed by database server 100, with any results to be returned back to client 102 for display to the requesting user. The database server 100 processes the database operation request from client 102, and determines whether the request involves a call to an external procedure 104. Consistent with the present invention, the external procedure 104 can be stored in a hybrid language having elements of both general purpose programming language statements as well as embedded database query language statements. For purposes of explanation only, and not by way of limitation, such embedded database query language statements are referred to herein as embedded SQL statements.

According to an embodiment of the invention, the external procedure 104 is compiled and archived into a shared dynamically linked library ("DLL"). The DLL is thereafter registered with the database server 100. A "listener" process, maintained by either the database server 100 or client 102, waits for a request involving an external procedure 104. When the listener process detects such a request, it invokes a separate "agent" process to dynamically load and execute the external procedure from the DLL. The agent process can be invoked to run in an address space separate from database server 100, to insulate the database server 100 from "untrusted" external routines. This enables the external routine to execute without concern of crashing or adversely affecting the local server. If the external procedure is later deemed to be reliable or safe, it can be invoked directly from the address space of the database server 100. Further details regarding the implementation of agent processes to execute external procedures are described in co-pending U.S. patent application Ser. No. 08/880,333, entitled "Apparatus and Method for Accessing Foreign Databases in a Heterogeneous database System", filed on Jun. 23, 1997, which is hereby incorporated by reference in its entirety.

Figure 2:
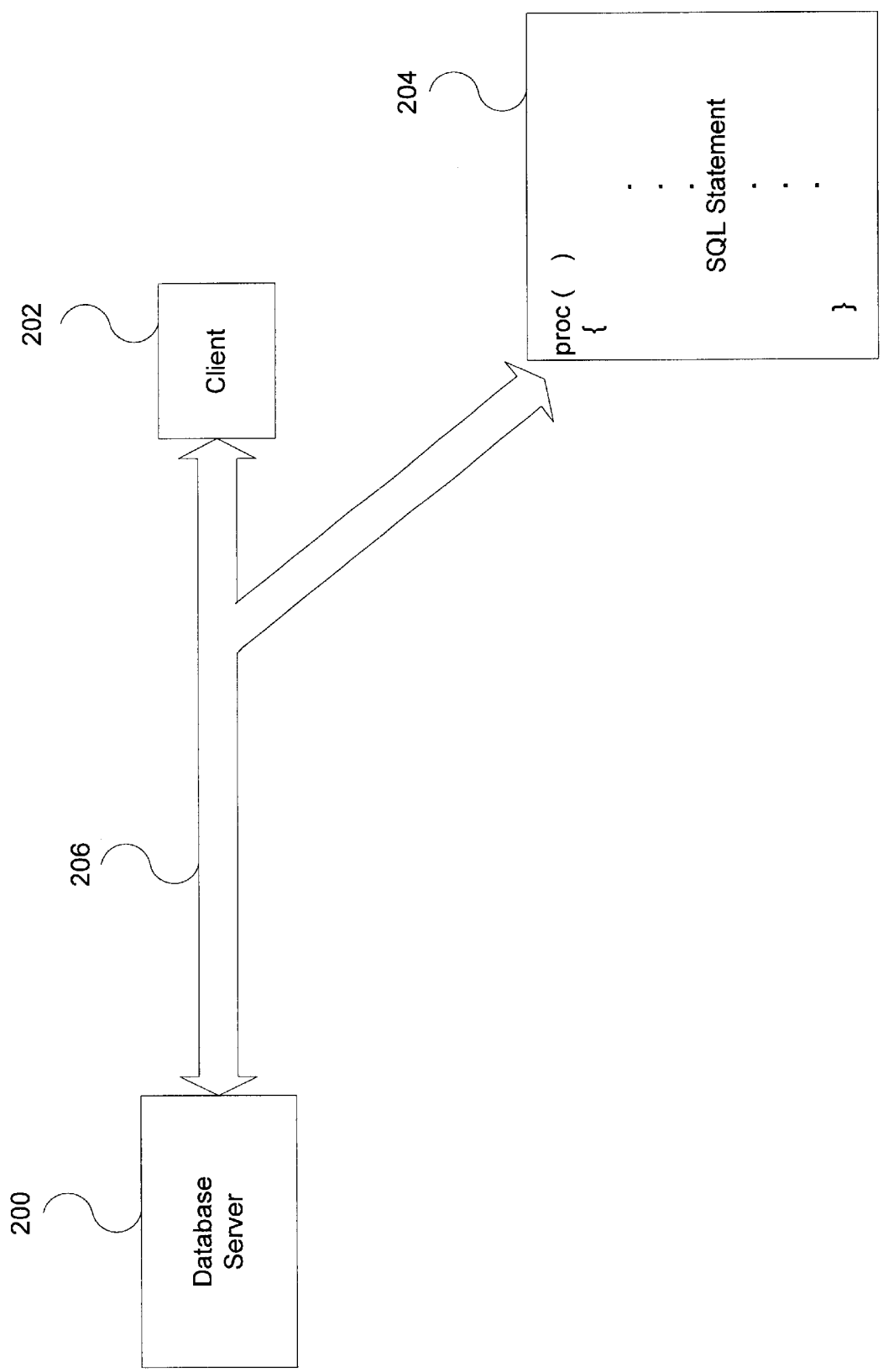
FIG. 2 illustrates an external procedure utilizing a prior connection between a client and a database server according to an embodiment of the invention.

FIG. 2 illustrates an aspect of the invention in which an external procedure 204 containing embedded SQL statements is called and executed within the same connection/session 206 as was opened by an original calling user at client 202. In this approach, the external procedure does not need to incur the expense and overhead of opening a new connection to the database, but can instead utilize the connection and session that has already been opened from client 202. In this manner, the external procedure is executed from within the same transaction that was used to call the external procedure.

Figure 3:
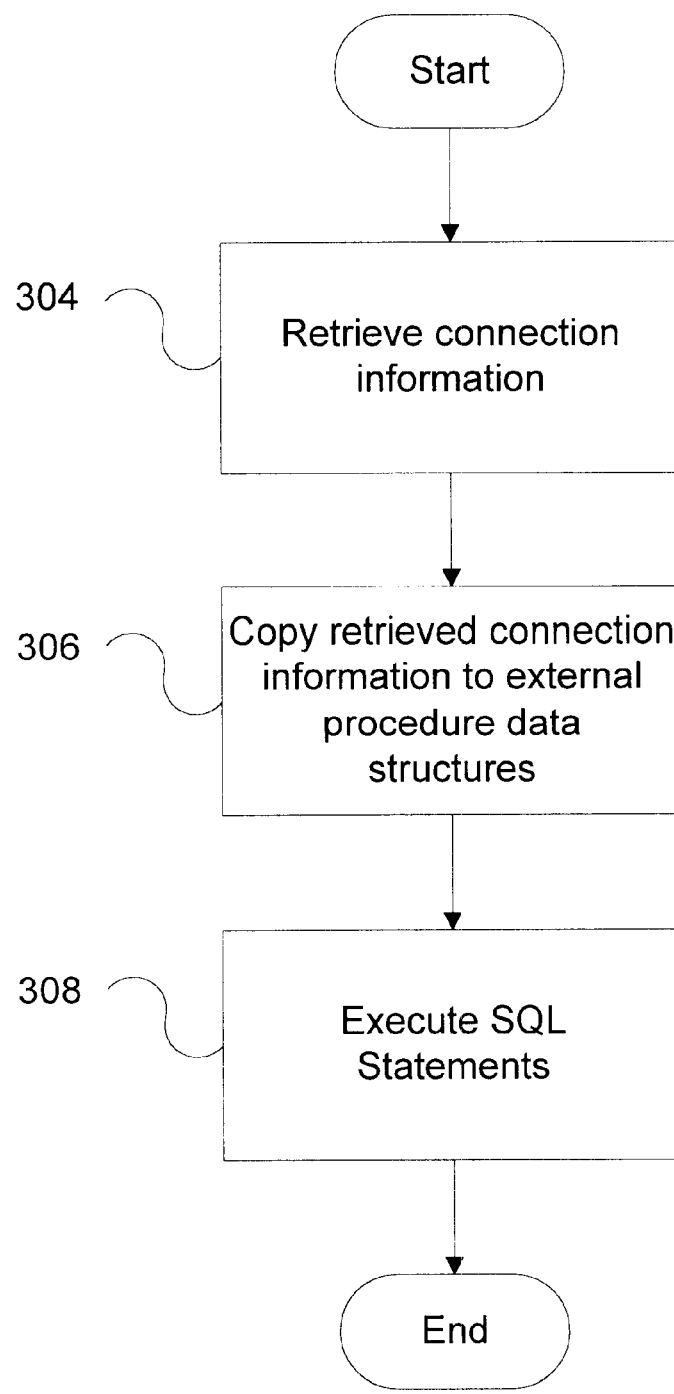
FIG. 3 depicts a flowchart of a process for executing an external procedure having embedded database query language statements according to an embodiment of the invention.

FIG. 3 provides a process flowchart for implementing a mechanism to connect an external procedure having an embedded SQL statement using the same session/connection as the calling user at client 202. When a user at client 202 establishes a session with the database server 200, that session is associated with a unique set of identifying parameters relating to the session and network connection (which are referred to herein as "handles"). According to the invention, these handles for the user session are identified when an external procedure containing embedded SQL is called (304). At process action 306, the handles for the open connection between client 202 and database server 200 are copied into equivalent connection data structures maintained by the external procedure to execute embedded SQL statements (306). This associates the external procedure with the session/connection that has been already opened by the user at client 202. The embedded SQL statement in the external procedure can now be executed (308). Because the embedded SQL statement in the external procedure executes within the same session and connection as the calling user at client 202, it can operate within the same transaction as the calling user at client 202.

As an illustrative example, consider the actions needed to implement the process of FIG. 3 with respect to the Oracle 8i database system available from Oracle Corporation. As stated above, the API used to create general purpose programming language routines to access the Oracle 8i database is the Oracle Call Interface ("OCI") API. SQLLIB is a client-side runtime library utilized with the Oracle 8i database to communicate between clients and servers using the SQL*Net networking software from Oracle Corporation. To execute an external procedure having embedded SQL in the Oracle 8i database using the process of FIG. 3, the OCI connection handles for an already-open session connection (i.e., the connection between the database server and the calling user at the client) are retrieved and used to populate its equivalent SQLLIB data structures. An example of a syntax that can be used for a command statement in the external procedure to implement this process is as follows:

EXEC SQL REGISTER CONNECT USING :epctx;

This statement retrieves the set of OCI connection handles that is associated with the current Oracle connection and uses these handles for the global SQLLIB runtime context.

The 'epctx' host variable refers to an OCI type 'OCIExtProcContext' that is created to conform with the OCI handles to be retrieved. This set of retrieved OCI handles includes, for example, 'OCIEnv', 'OCISvcCtx', and 'OCIError'. With ordinary hybrid language programs, such as Pro*C/C++, an "EXEC SQL CONNECT" statement establishes a new connection to the database server. In contrast, the present "EXEC SQL REGISTER CONNECT" statement is used in lieu of the typical EXEC SQL CONNECT statement in the body of the program to access a previously opened connection. This allows a server-side external procedure in a hybrid language having embedded SQL to call back into the database server.

This EXEC SQL REGISTER CONNECT statement is appropriate if the external procedure is executed by a non-multithreaded agent process. However, a multithreaded agent process can be implemented having multiple individual threads that each executes a different external procedure. In this approach, individual threads of the multithreaded agent process are associated with separate sessions/connections to the database server 200. For this reason, the retrieved OCI handle information cannot be associated with the global SQLLIB runtime context. Instead, the runtime context for each thread, is associated with a specific set of OCI handles. Thus, for multithreaded agent processes, the following is an example of syntax that can be employed for the EXEC SQL REGISTER CONNECT statement:

EXEC SQL REGISTER CONNECT USING :epctx [RETURNING :rctx];

Similar to the previous statement, this statement retrieves the set of OCI handles associated with a previously opened connection. However, the optional RETURNING clause causes the results to be returned into the 'rctx' variable, which is a runtime context variable to hold the returned OCI handle information. The runtime context of the thread of the multithreaded agent process assigned to the external procedure is thereafter set to the :rctx context variable. At that time, the OCI handles that are retrieved as well as the returned SQLLIB runtime context will be associated with the thread's connection.

Figure 4:
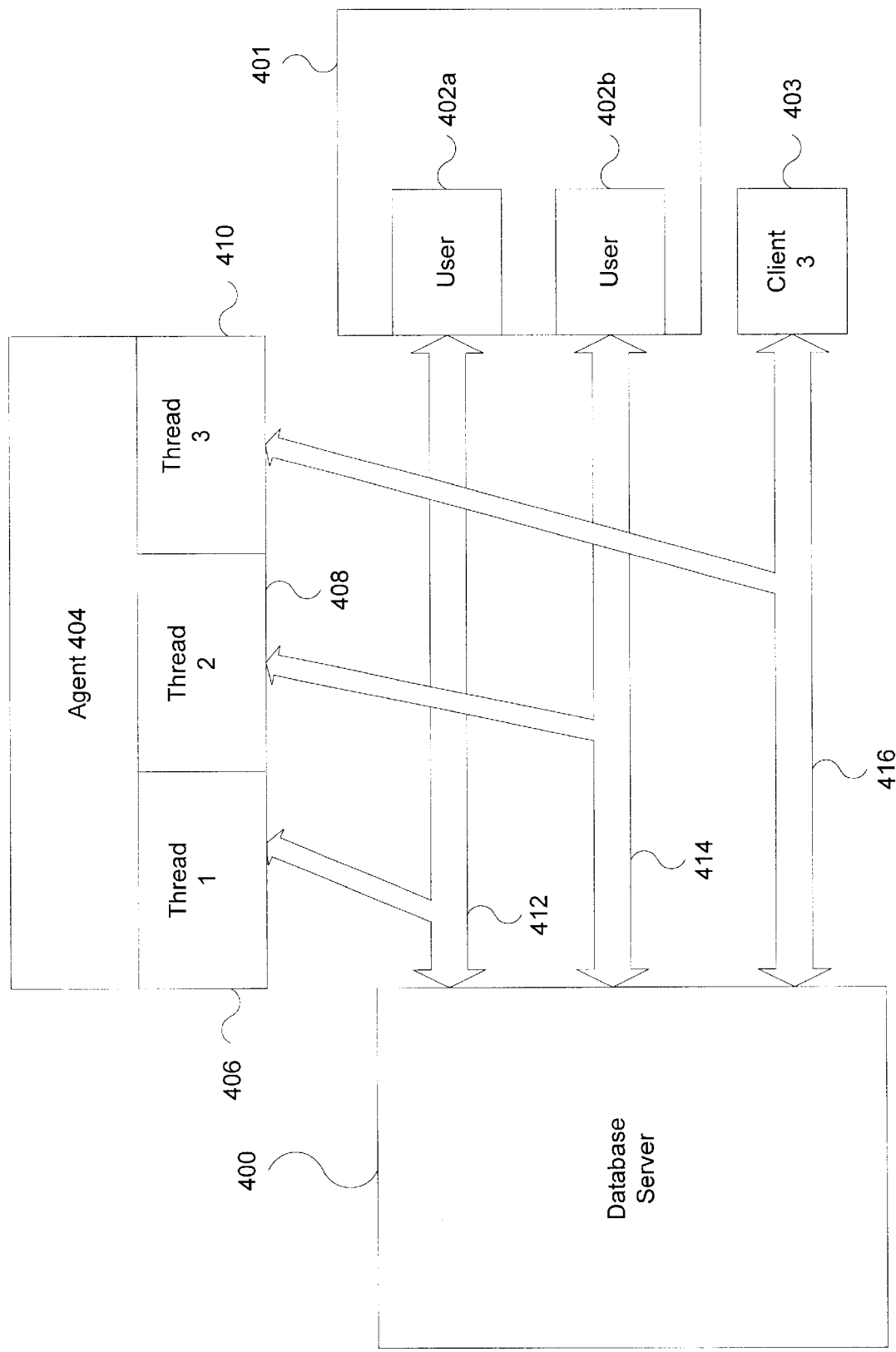
FIG. 4 illustrates multiple external procedures executed by a multithreaded agent process.

Referring to FIG. 4, illustrated is an embodiment of the invention in which a multithreaded agent process 404 has a plurality of threads 406, 408, and 410 that execute external procedures, with each thread associated with a different connection to the database server 400. Thus, the context of thread 406 is associated with connection 412, the context of thread 408 is associated with connection 414, and the context of thread 410 is associated with connection 416. Note that connections 412 and 414 both go between client 401 and database server 400. This may occur, for example, if multiple users 402a and 402b on client 401 have established separate sessions with database server 400, which results in different connections 412 and 414 being established for each user.

According to the preferred embodiment, the runtime context information between different threads on a multithreaded agent process can be shared and managed persistently. To prevent the loss of state information when threads terminate, runtime context information is stored in memory of the agent process that is not tied to any particular thread. Such memory is referred to as persistent memory because the data stored therein is not automatically lost at the termination of a thread. Context handles are assigned to the persistent context information stored at the agent process. In this manner, when a thread terminates, the context information for that thread can be reused by another thread. Additional details for sharing and persistently storing runtime context information is described in co-pending U.S. patent application Ser. No. 08/858,616 entitled "Runtime Context Variables", filed on Feb. 28, 1997, which is hereby incorporated by reference in its entirety.

One advantage provided by this approach is that the time and resources to set up a thread to use an existing connection is minimized if a prior thread utilizing that connection has saved its runtime context information. Instead of performing the process actions of FIG. 3, the later thread can access the open connection by obtaining the context handle saved by the earlier thread. The context handle provides the information needed by the thread to access the open connection.

Figure 5:
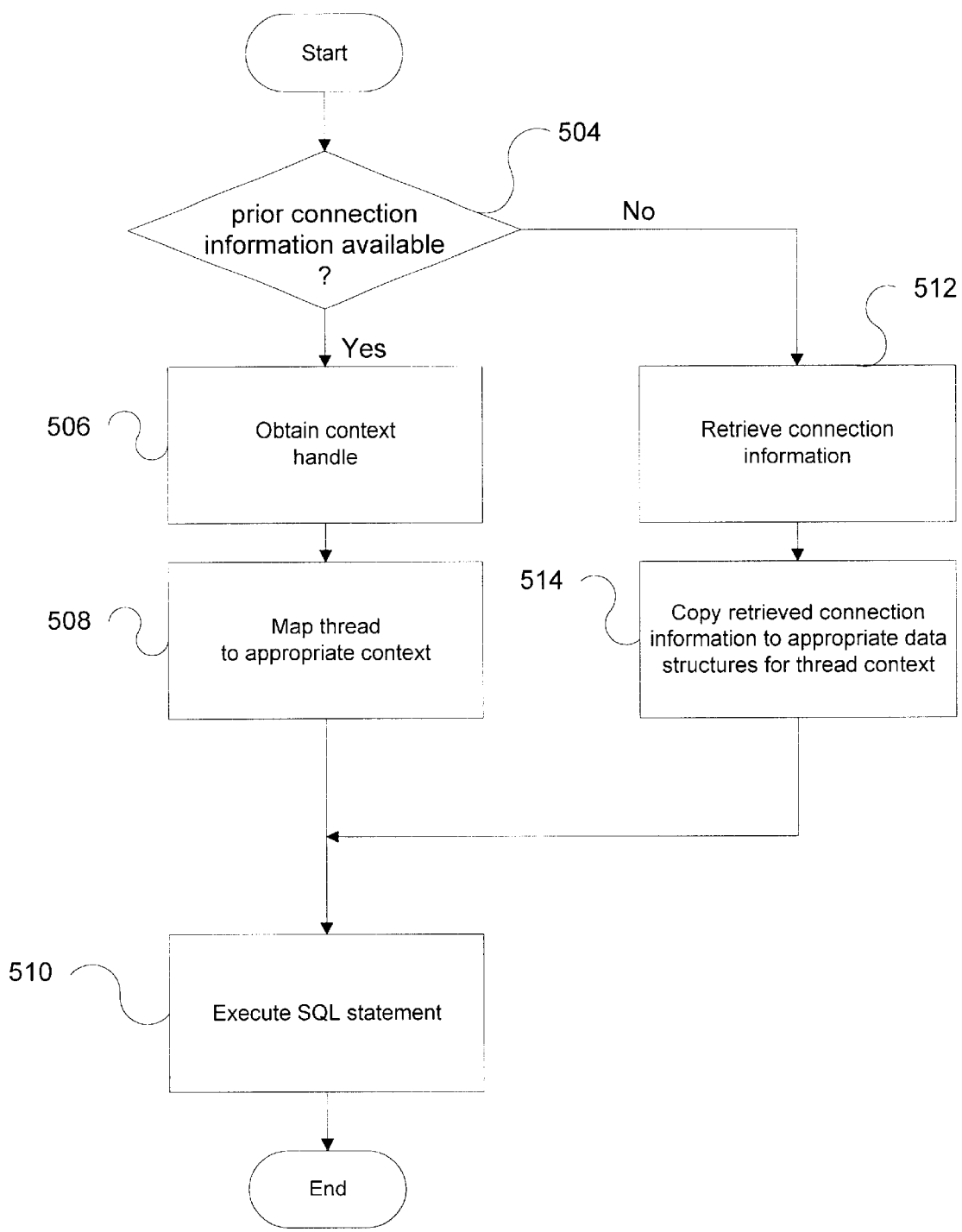
FIG. 5 depicts a flowchart of a process for executing an external procedure using saved context information according to an embodiment of the invention.

FIG. 5 illustrates a process flowchart of this method for saving and obtaining persistent context information to access an open connection. Initially, a determination is made whether the runtime context information from a prior external procedure for the session/connection to be accessed has been saved (504). If the runtime context information was saved, then the thread for the present external procedure obtains the context handle for the saved runtime context information (506). The session/connection handles for the saved runtime context information is thereafter mapped to the required SQL connection structures for the external procedure being executed by the present thread (508). If, at process action 504, it was determined that needed runtime context information does not exist, then the appropriate data structures relating to the connection between the user/client and the database server are retrieved and copied into the equivalent data structures for the external procedure (512). For an Oracle database, this involves retrieving OCI context information and inserting that information into the appropriate SQLLIB context for that thread. The context information is thereafter saved and assigned to a context handle for the next thread that needs to access the same session/connection (514).

An additional advantage of allowing embedded SQL in the external procedure to call back into the database server within the same session as the original calling entity is that prior database operations made within the same transaction are rendered visible to the external procedure. These prior operations are visible even if they have not been committed. Thus, if a user performs an INSERT operation to a table prior to calling an external procedure having embedded SQL (without committing the change), a SELECT statement in that external procedure to the same table will retrieve the data that was inserted.

An additional advantage exists in which data modification made by a prior external procedure are visible to a later external procedure. In effect, the later external procedure can continue data operations begun by an earlier external procedure. Since runtime context information is persistently saved for the earlier external procedure, the later external procedure can perform data operations based upon the status of data resulting from operations performed by the earlier external procedure. This is true even if the changes made by the earlier external procedure are not committed.

Figure 6:
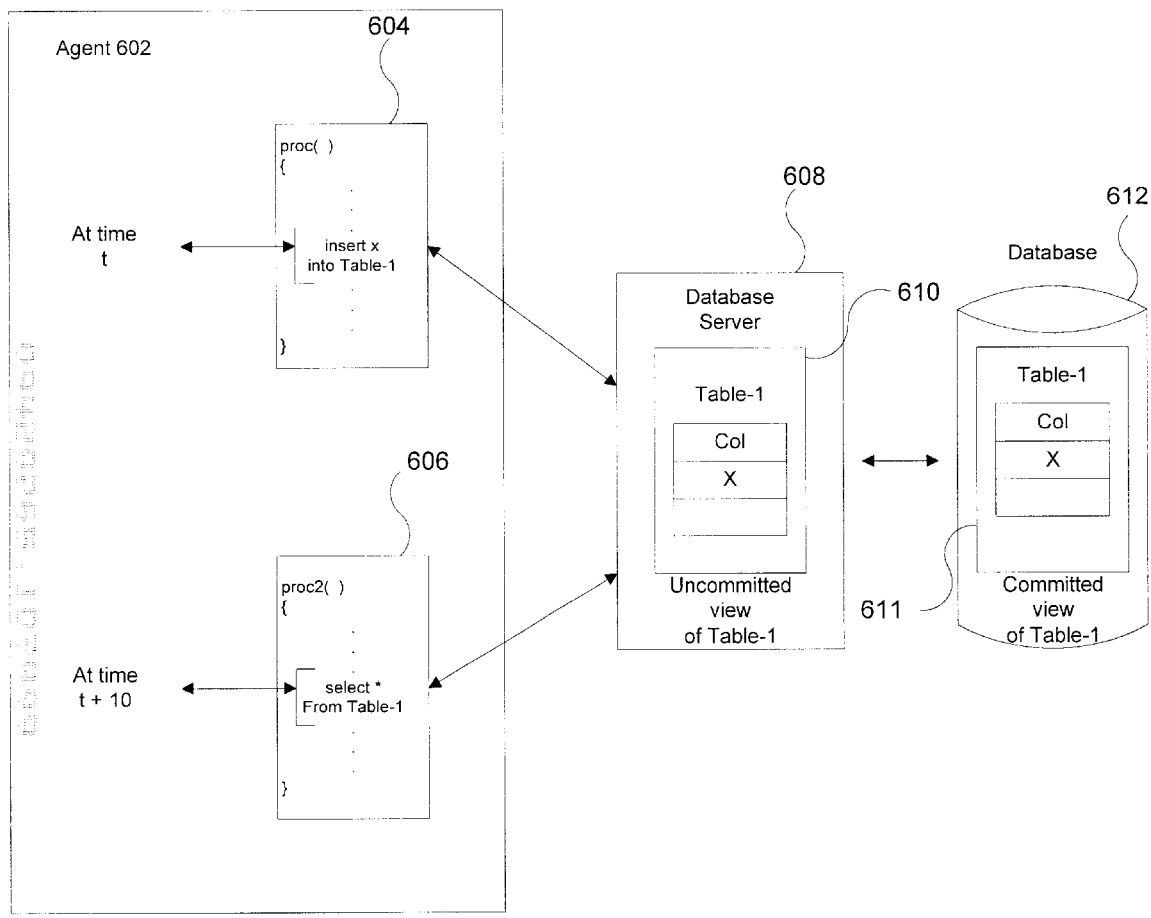
FIG. 6 illustrates a later external procedure accessing data changes made by an earlier external procedure.

FIG. 6 illustrates this aspect of the invention, in which a first external procedure 604 executed by agent 602 performs an INSERT operation at time t. That INSERT operation causes a value "X" to be inserted into Table_1, which is reflected by the memory representation 610 of Table_1 at database server 608. If this data operation has not been committed, then the committed data representation 611 for Table_1 at database 612 will not reflect this data operation. Any data operation that seeks to access Table_1 outside of this transaction will not be able to access the data inserted by the INSERT statement, since they will access the committed data representation 611 of Table_1.

With the present invention, a later external procedure 606 can be specified to operate with the same session and transaction as the earlier external procedure 604. Because this later external procedure 606 operates using the saved runtime context information as earlier external procedure 604, it can access any data changes made by the earlier external procedure, whether or not committed. Thus, a SELECT operation made by external procedure 606 at time t+10 can access data inserted by the INSERT statement made by external procedure 604 at time t in the uncommitted data representation 610 of Table_1.

Note that a multithreaded agent process is not required to implement persistent context information for external procedures. If a persistent agent process is employed which does not terminate after it has finished executing an external procedure, then that agent process can persistently save context information even if it is not a multithreaded process. Any later external procedures involving the same session/connection as an earlier external procedure call can thus use the saved context information by that agent process to access the previously opened connection.

According to an embodiment of the invention, a public function can be used to return an error from an external procedure having embedded SQL. The following is an example of syntax that can be used for this function:

SQLExtProcError (ctx, msg, msglen)
   SQL_CONTEXT *ctx;
   char *msg;
   size_t msglen;

where SQL_CONTEXT is the target SQLLIB runtime context for which the REGISTER CONNECT statement was executed. If the agent is not multithreaded, only the global runtime context is used for this function. The error message and the message length comprise the remaining parameters of this function.

A statement can be placed in the embedded SQL to specify a particular context to be used by the external procedure. The following is an example of syntax for this statement:

EXEC SQL CONTEXT USE { DEFAULT | :hv };

The ":hv" variable refers to the runtime context that is being specified. Using 'DEFAULT' signifies that the default global runtime context will be used in all embedded SQL statements that lexically follow the statement until it is overridden by another EXEC SQL CONTEXT USE statement. This type of directive statement can be implemented using the method described in copending U.S. patent application Ser. No. 08/585,616.

The following is an example of this statement used in embedded SQL for an Oracle 8i database system:

```
void main( )
{
    SQL_CONTEXT ctx; /* runtime context variable */
    char *usr1 = "scott/tiger";
    char *user2 = "system/manager";
    EXEC SQL CONNECT :usr1;/* scott in global runtime context */
    EXEC SQL CONTEXT ALLOCATE :ctx; /* Details regarding this statement
    are disclosed in U.S. patient application Ser. No. 08/585,616.*/
    EXEC SQL CONTEXT USE :ctx;
    EXEC SQL CONNECT :usr2; /* system in runtime context 'cxt' */
    /* Insert into the emp table from schema scott */
    EXEC SQL CONTEXT USE DEFAULT;
    EXEC SQL INSERT INTO emp (empno, ename) VALUES (1234, "JohnDoe");
}
```

ILLUSTRATIVE EXAMPLE

An example of steps involved for creating, implementing, and using the present invention for an Oracle 8i database system follows:

1. Create a shared library for the external procedure by executing the following statement:
CREATE LIBRARY <library_name> as 'filename'
This is the shared library that holds the external procedure. The external procedure dynamically loads from this library when invoked at runtime.

2. Create the stored procedure with the following statements:
CREATE OR REPLACE PROCEDURE extproc
AS EXTERNAL LIBRARY 'filename' NAME 'extproc'
   LANGUAGE C
WITH CONTEXT PARAMETERS (Context);
The EXTERNAL clause identifies this as an external procedure, having the name "extproc", whose base programming language is 'C'. If another general purpose programming language is used, then the appropriate language identifier is substituted instead. The NAME of the external procedure is given as well as the LIBRARY to which it belongs. This statement registers the external procedure with the database system.

3. The next step is to create the external procedure. The following is an example of an external procedure created using the Pro*C/C++ language in which only the embedded SQL statements are shown:

```
#include <ociextp.h> /* header file for external procedure mechanism in Oracle 8i
database system*/
    void extproc( epctx )
    OCIExtProcContext *epctx;
    {
        ...
        EXEC SQL REGISTER CONNECT USING :epctx;
        EXEC SQL SELECT * FROM Table_Name;
        ...
        return;
    }
```

4. The external procedure is thereafter precompiled, compiled, and inserted into the shared library.
5. At runtime, a user invokes the external procedure. This causes the external procedure to be dynamically loaded and executed by an agent process. The following example shows the above external procedure invoked from a SQL*Plus command line:

SQL > BEGIN
SQL > INSERT INTO Table_Name VALUES (123, "John Doe", 456, "Jay Smith");
SQL > extproc;
SQL > END In the present invention, this sequence of commands first establishes a session connection for the user. The INSERT statement then inserts the values into the table "Table_Name". Once the external procedure "extproc" is called, it is assigned to an agent process to be executed from the same session as was established for the user using the REGISTER CONNECT statement. When this occurs, the change made by the INSERT statement becomes visible to the external procedure.

SYSTEM ARCHITECTURE OVERVIEW

Figure 7:
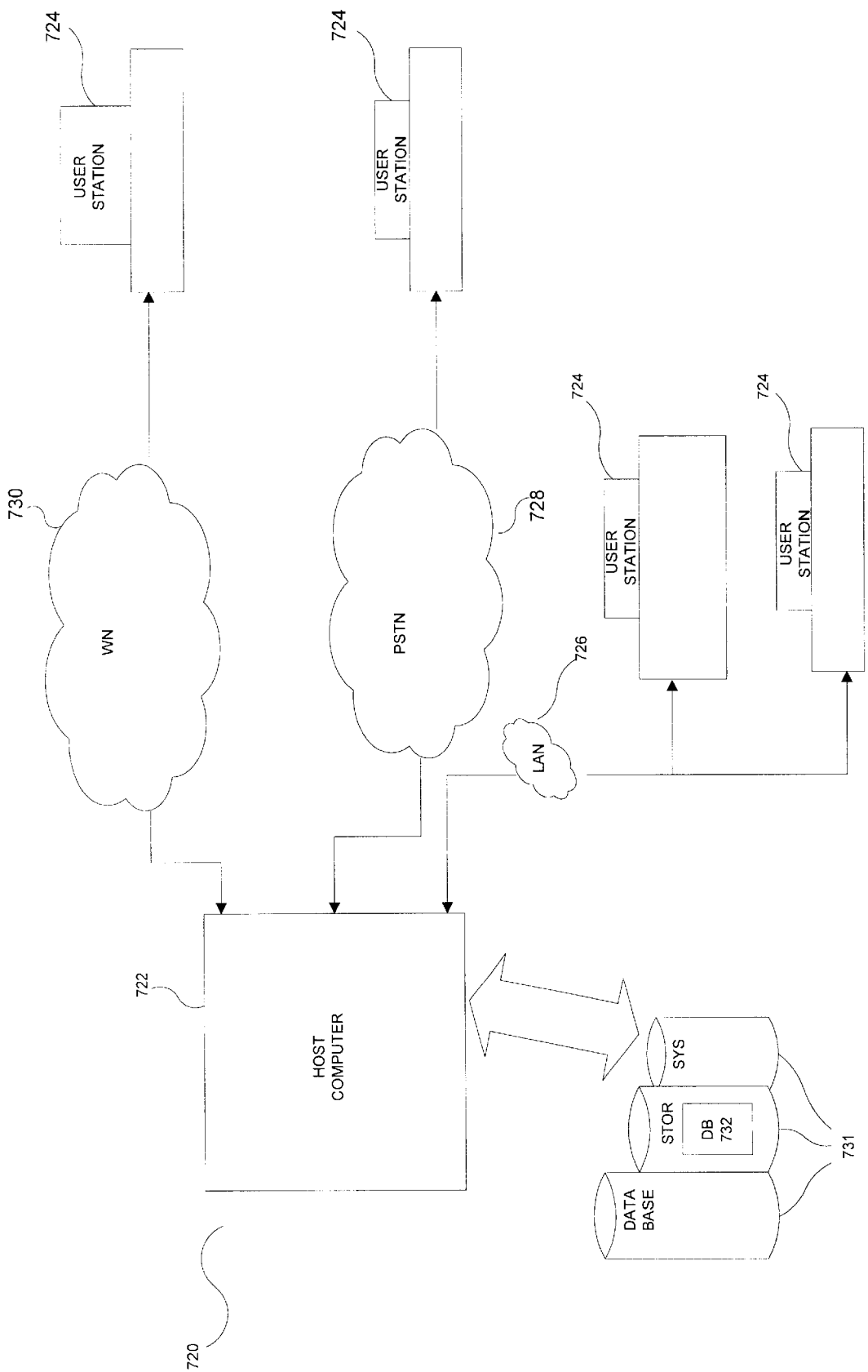
FIG. 7 is a diagram of a computer hardware system with which the present invention can be implemented.

Referring to FIG. 7, in an embodiment, a computer system 720 includes a host computer 722 connected to a plurality of individual user stations 724. In an embodiment, the user stations 724 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 that is readily accessible by the host computer 722.

In alternative embodiments, the database 732 may be resident on the host computer, stored, e.g., in the host computer's ROM, PROM, EPROM, or any other memory chip, and/or its hard disk. In yet alternative embodiments, the database 732 may be read by the host computer 722 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 722 can access two or more databases 732, stored in a variety of mediums, as previously discussed.

Figure 8:
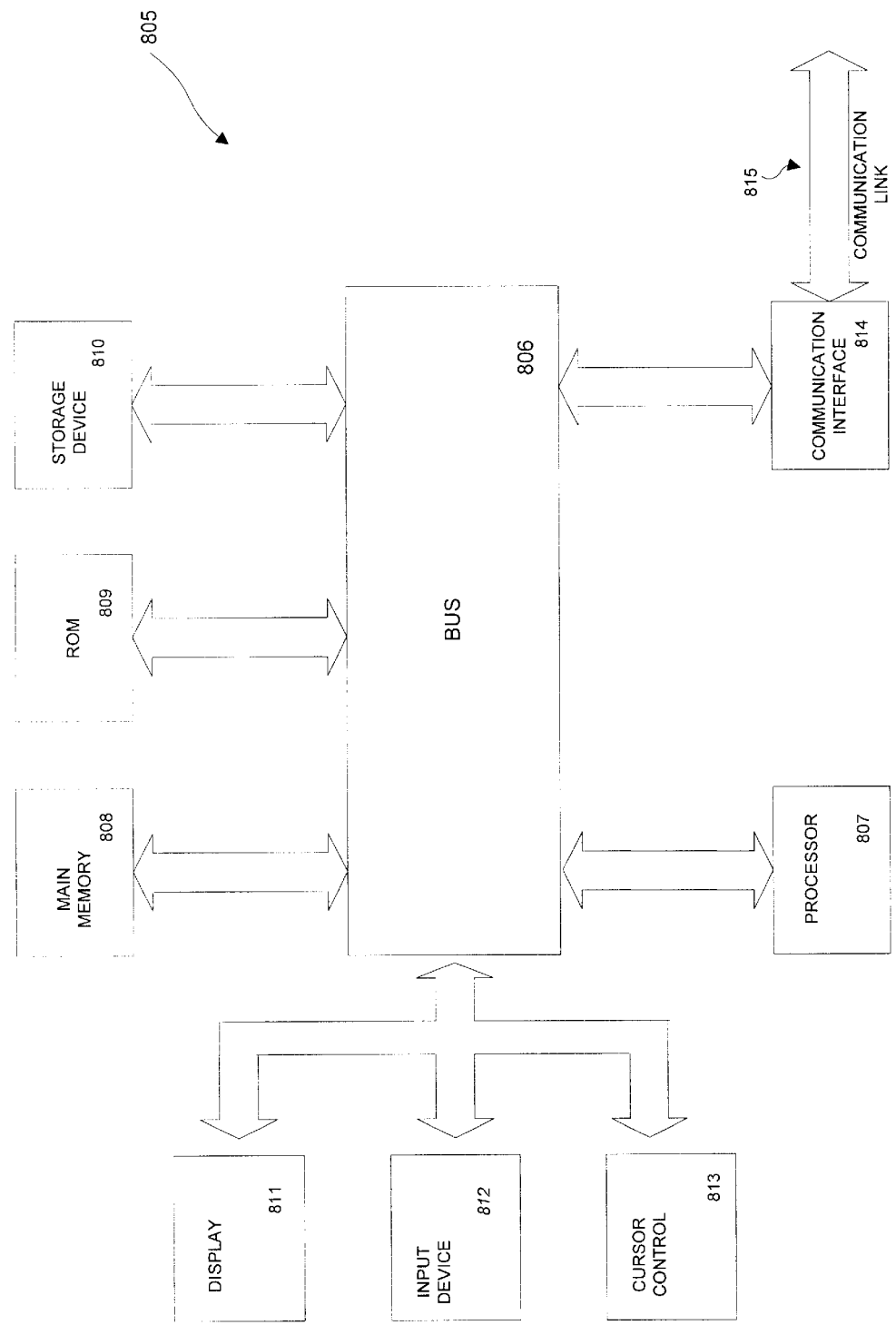
FIG. 8 is an additional diagram of computer hardware system with which the present invention can be implemented.

Referring to FIG. 8, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807.

A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A processing unit may be coupled via the bus 806 to a display device 811, such as, but not limited to, a cathode ray tube (CRT), for displaying information to a user. An input device 812, including alphanumeric and other keys, is coupled to the bus 806 for communicating information and command selections to the processor(s) 807. Another type of user input device may include a cursor control 813, such as, but not limited to, a mouse, a trackball, a fingerpad, or cursor direction keys, for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information.

Various forms of computer-usable media may be involved in providing one or more sequences of one or more instructions to the processor(s) 807 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 806 may receive the infrared signals and place the instructions therein on the bus 806. The bus 806 may carry the instructions to the main memory 808, from which the processor(s) 807 thereafter retrieves and executes the instructions. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 724 and the host computer 722. The communication interface 814 of a respective processing unit transmits and receives electrical, electromagnetic or optical signals that include data streams representing various types of information, including instructions, messages and data.

A communication link 815 links a respective user station 724 and a host computer 722. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730.

A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A process for executing an external procedure in a database system comprising:

identifying connection information for an entity that calls an external procedure, said external procedure is a hybrid programming language program, said hybrid programming language program comprising a general purpose programming language statement and an embedded database query language statement, said embedded database query language statement calls into a database system, said connection information identifying a specific session opened by said entity;

mapping said connection information to equivalent connection data structures maintained for said external procedure; and executing said embedded database query language statement within said specific session previously opened by said entity.

2. The process of claim 1 in which said embedded database query language statement is a SQL statement.

3. The process of claim 1 in which said embedded database query language statement is a SQL-derived statement.

4. The process of claim 1 in which a programming language of said hybrid programming language program is selected from the group consisting of Pro*C/C++ or Pro*COBOL.

5. The process of claim 1 in which said embedded database query language statement is executed within an open transaction that was initiated by said entity.

6. The process of claim 5 in which said embedded database query language statement accesses data modified earlier in time by said entity within said open transaction.

7. The process of claim 6 in which said data was modified by an earlier external procedure called by said entity.

8. The process of claim 1 in which said act of identifying said connection information comprises identifying a context handle for a persistently saved context, said act of mapping comprises obtaining said context handle so that said external procedure operates using said persistently saved context to access said specific session previously opened by said entity.

9. A process for executing an external procedure in a database system comprising:

receiving a request to execute an external procedure, said request made by an entity having opened a connection to a database server;

invoking said external procedure, said external procedure is a hybrid programming language program, said hybrid programming language program comprising a general purpose programming language statement and an embedded database query language statement;

retrieving runtime context information for said connection; and executing said external procedure within said connection by using said retrieved runtime context information.

10. The process of claim 9 in which said act of invoking said external procedure is performed by an agent process.

11. The process of claim 10 in which said agent process is multithreaded, and said external procedure is executed by a first thread of said agent process.

12. The process of claim 11 in which a second thread of said agent process executes a second external procedure using a second connection.

13. The process of claim 11 in which a second thread of said agent process performs data operations at a time later than execution of said external procedure by said first thread, said second thread obtaining runtime context information saved from said first thread, said second thread accessing data changes made by said first thread.

14. The process of claim 9 in which said retrieved runtime context information is persistently saved.

15. The process of claim 9 in which said entity had called said external procedure during an open transaction, said external procedure operating upon uncommitted data changes made earlier in said transaction by said entity.

16. The process of claim 9 in which said embedded database query language statement is a SQL or SQL-derived statement.

17. The process of claim 9 in which a programming language of said hybrid programming language program is selected from the group consisting of Pro*C/C++ or Pro*COBOL.

18. A computer program product that includes a computer readable medium usable by a processor, the medium having stored thereon a sequence of instructions which, when executed by said processor, causes said processor to execute a process for executing an external procedure in a database system, said process comprising:
   identifying connection information for an entity that calls an external procedure, said connection information identifying a specific session opened by said entity, said external procedure is a hybrid programming language program, said hybrid programming language program comprising a general purpose programming language statement and an embedded database query language statement, said embedded language statement calls into a database system;
   mapping said connection information to equivalent connection data structures maintained for said external procedure; and
   executing said embedded database query language statement within said specific session previously opened by said entity.

19. The computer program product of claim 18 in which said embedded database query language statement is a SQL or SQL-derived statement.

20. The computer program product of claim 18 in which programming language of said hybrid programming language program is selected from the group consisting of Pro*C/C++ or Pro*COBOL.

21. The computer program product of claim 18 in which said embedded database query language statement is executed within an open transaction that was initialed by said entity.

22. The computer program product of claim 21 in which said embedded database query language statement accesses data modified earlier in time by said entity within said open transaction.

23. The computer program product of claim 22 in which said data was modified by an earlier external procedure called by said entity.

24. The computer program product of claim 18 in which said act of identifying said connection information comprises identifying a context handle for a persistently saved context, said act of mapping comprises obtaining said context handle so that said external procedure operates using said persistently saved context to access said specific session previously opened by said entity.

25. A computer program product that includes a computer-readable medium usable by a processor, the medium having stored theron a sequence of instructions which, when executed by said processor, causes said processor to execute a process for executing an external procedure in a database system, said process comprising:
   receiving a request to execute an external procedure, said request made by an entity having opened a connection to a database server;
   invoking an external procedure, said external procedure is a hybrid programming language program, said hybrid programming language program comprising a general purpose programming language statement and an embedded database query language statement;
   retrieving runtime context information for said connection; and
   executing said exteral procedure within said connection by using said retrieved runtime context information.

26. The computer program product of claim 25 in which said act of invoking said external procedure is performed by an agent process.

27. The computer program product of claim 26 in which said agent process is multithreaded, and said external procedure is executed by a first thread of said agent process.

28. The computer program product of claim 27 in which a second thread of said agent process executes a second external procedure using a second connection.

29. The computer program product of claim 27 in which a second thread of said agent process performs data operations at a time later than execution of said external procedure by said first thread, said second thread obtaining runtime context information saved from said first thread, said second thread accessing data changes made by said first thread.

30. The computer program product of claim 25 in which said retrieved runtime context information is persistently saved.

31. The computer program product of claim 25 in which said entity had called said external procedure during an open transaction, said external procedure operating upon uncommitted data changes made earlier in said transaction by said entity.

32. The computer program product of claim 25 in which said embedded database query language statement is a SQL or SQL-derived statement.

33. The computer program product of claim 25 in which a programming language of said hybrid programming language program is selected from the group consisting of Pro*C/C++ or Pro*COBOL.

* * * * *